(12) United States Patent
Park et al.

(10) Patent No.: US 11,932,556 B2
(45) Date of Patent: Mar. 19, 2024

(54) SATURATOR AND WATER TREATING APPARATUS INCLUDING THE SAME

(71) Applicant: DOOSAN ENERBILITY CO., LTD., Changwon-si (KR)

(72) Inventors: Byung Sung Park, Incheon (KR); Jin Woo Kim, Seoul (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 608 days.

(21) Appl. No.: 17/147,464

(22) Filed: Jan. 13, 2021

(65) Prior Publication Data

US 2021/0130194 A1    May 6, 2021

Related U.S. Application Data

(62) Division of application No. 14/593,100, filed on Jan. 9, 2015, now abandoned.

(30) Foreign Application Priority Data

Mar. 5, 2014    (KR) .................. 10-2014-0026222

(51) Int. Cl.
*C02F 1/24* (2023.01)
*B01D 21/00* (2006.01)
(Continued)

(52) U.S. Cl.
CPC ............ *C02F 1/24* (2013.01); *B01D 21/0084* (2013.01); *B01F 23/231244* (2022.01);
(Continued)

(58) Field of Classification Search
CPC .... C02F 2301/026; C02F 1/24; B01D 1/1431; B01F 23/23124; B01F 23/231265
(Continued)

(56) References Cited

U.S. PATENT DOCUMENTS 4,268,279 A    5/1981 Shindo et al.
4,897,359 A    1/1990 Oakley et al.
(Continued)

FOREIGN PATENT DOCUMENTS

GB          2476847 A       7/2011
JP       2004-037017 A      2/2004
(Continued)

OTHER PUBLICATIONS

An European oral proceedings issued on Oct. 29, 2019 in connection with European Patent Application No. 15151339.7 which corresponds to the above-referenced U.S. application.
(Continued)

*Primary Examiner* — Claire A Norris
(74) *Attorney, Agent, or Firm* — Harvest IP Law, LLP (57) ABSTRACT

A saturator, configured for use in a water treating apparatus, includes a chamber, in which a first flow path through which first fluid flows is formed, and a plurality of porous membranes disposed in the first flow path, a second flow path formed within the plurality of porous membranes, through which second fluid flows. The first fluid is dissolved in the second fluid, or the second fluid is dissolved in the first fluid. Accordingly, a contact area between the first fluid and the second fluid is enlarged, and thus, a dissolving speed increases.

19 Claims, 6 Drawing Sheets

(51) Int. Cl.
  *B01F 23/231* (2022.01)
  *B03D 1/14* (2006.01)
(52) U.S. Cl.
  CPC .... *B01F 23/231265* (2022.01); *B03D 1/1431* (2013.01); *C02F 2301/026* (2013.01); *C02F 2301/028* (2013.01); *C02F 2301/046* (2013.01)
(58) Field of Classification Search
  USPC .............................. 210/321.8, 150; 261/100
  See application file for complete search history.

(56) References Cited

U.S. PATENT DOCUMENTS

| | | | |
|---|---|---|---|
| 5,254,143 A | 10/1993 | Anazawa et al. | |
| 5,779,897 A | 7/1998 | Kalthod et al. | |
| 6,209,855 B1 * | 4/2001 | Glassford | B01F 23/23124 210/150 |
| 8,021,619 B2 * | 9/2011 | Nickel | B01D 63/02 422/503 |
| 2011/0114565 A1 * | 5/2011 | Roberts | B03D 1/1412 210/197 |
| 2012/0024784 A1 | 2/2012 | Clark et al. | |

FOREIGN PATENT DOCUMENTS

| | | |
|---|---|---|
| KR | 2002-0013705 A | 2/2002 |
| KR | 2011-0049543 A | 5/2011 |
| WO | 98/17362 A | 4/1998 |
| WO | 0168531 A1 | 9/2001 |
| WO | 2012065250 A1 | 5/2012 |

OTHER PUBLICATIONS

2 European Search Report in connection with counterpart EP application No. 15151399, dated Jul. 6, 2015.

* cited by examiner

SATURATOR AND WATER TREATING APPARATUS INCLUDING THE SAME

CROSS-REFERENCE TO RELATED APPLICATIONS

This application is a division of U.S. application Ser. No. 14/593,100, filed on Jan. 9, 2015, which claims benefit of priority to Korean Patent Application No. 10-2014-0026222 filed on Mar. 5, 2014 in the Korean Intellectual Property Office, the disclosure of which is incorporated herein by reference in its entirety.

BACKGROUND OF THE INVENTION

1. Field of the Disclosure

The present disclosure relates to a saturator and a water treating apparatus including the same, and particularly, to a saturator which dissolves air in water, and to a water treating apparatus which removes a foreign material by floating dissolved air in a water treating operation with the saturator.

2. Background of the Disclosure

Generally, a water treating apparatus is an apparatus that produces fresh water with seawater, obtains living water, drinking water, and industrial water, or appropriately treats raw water for purifying waste water. The water treating apparatus includes an apparatus for removing a foreign material which is mixed with raw water.

Figure 1:
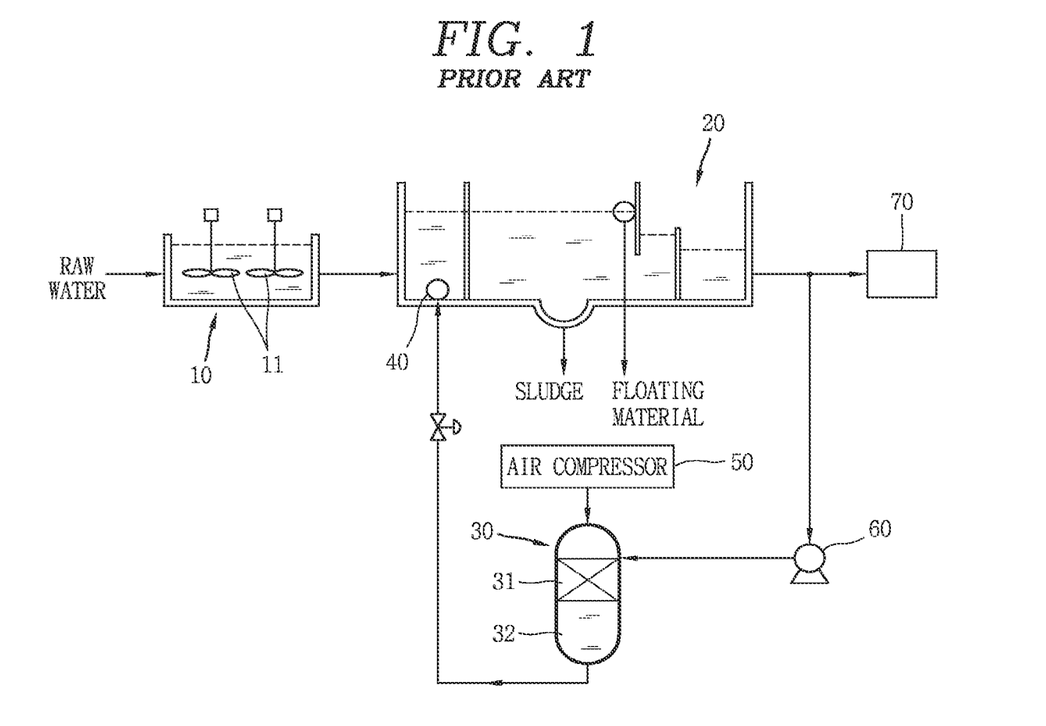
FIG. 1 is a diagram schematically illustrating a related art dissolved air floating apparatus.

An example of an apparatus for removing a foreign material includes a dissolved air floating apparatus. The dissolved air floating apparatus is an apparatus that agglutinates a foreign material by mixing a medicine (e.g. a coagulant) with raw water to be treated, and floats the agglutinated foreign material along with an air bubble to remove the agglutinated foreign material. Referring to FIG. 1, the dissolved air floating apparatus includes a reaction and agglutination tank 10, a floatation tank 20, a circulation pump 60, an air compressor 50, and a saturator 30.

In the reaction and agglutination tank 10, raw water to be treated is mixed with an agglutination agent and an agglutination aid, and thus, a particulate material or a floating material, having a relatively low density, such as an organic compound and algae contained in the raw water, is agglutinated. An agitator 11 for mixing an agglutination agent with a foreign material contained in raw water to generate a floc may be provided in the reaction and agglutination tank 10.

Water passing through the reaction and agglutination tank 10 flows into the floatation tank 20, an air bubble is adsorbed onto the floc, and a combined body thereof floats onto a water surface. At this time, water in which air is oversaturated in the saturator 30 is depressurized through a nozzle 40 which is provided in the floatation tank 20, and flows into the floatation tank 20, thereby producing the air bubble. The air compressor 50 supplies compressed air to the saturator 30. Water from which foreign materials such as sludge and a floating material are removed in the floatation tank 20 moves to a water purifying apparatus 70, or is supplied to the saturator 30 through the circulation pump 60.

The saturator 30 is an apparatus for dissolving compressed air in water which flows into the apparatus through the circulation pump 60. In a related art saturator, a water collecting space 32 is formed at a lower portion of the related art saturator, and a filler 31 is filled on the water collecting space 32. The compressed air and the water flows from an upper end of the saturator 30 into the inside, and the compressed air is dissolved in the water while the compressed air and the water is passing through the filler 31, whereby the compressed air and the water are collected in the water collecting space 32. Therefore, the related art saturator has a vertical long shape.

In the related art saturator, dissolving efficiency is determined based on a shape of a filler or a filling amount, and thus, the saturator is designed to have a higher height for increasing the dissolving efficiency. Also, the dissolving efficiency is proportional to a residence time in the water collecting space 32, and thus, the saturator is designed so that the water in which the compressed air is dissolved remains in the water collecting space 32 for as long as possible. Therefore, the related art saturator is configured with a pressure vessel which has a high height and a large volume. Also, when the related art saturator is applied to a dissolved air floating apparatus having a relatively large capacity, the related art saturator is disposed on the reaction and agglutination tank 10 or the floatation tank 20 so as to shorten a pipe distance to the nozzle 40.

Therefore, a height of a building in which a dissolved air floating apparatus including the related art saturator is provided becomes wholly high, and for this reason, much cost is expended in installation and operation.

Moreover, in the related art saturator, water is circulated between the floatation tank 20 and the saturator 30 by the circulation pump 60. In this case, a flow rate of the circulated water is determined based on a pressure of the saturator 30 and the number of nozzles which are provided in the floatation tank 20. Therefore, when desiring to change a flow rate of the circulated water in a state of maintaining the pressure of the saturator 30, the number of nozzles should be changed after an operation of a water treating apparatus stops.

SUMMARY OF THE DISCLOSURE

Therefore, an aspect of the detailed description is to provide a saturator and a water treating apparatus including the same, in which a contact area is enlarged when compressed air is dissolved in water in the saturator, thereby enhancing dissolving efficiency.

Another aspect of the detailed description is to provide a saturator and a water treating apparatus including the same, in which a speed where compressed air is dissolved in water in the saturator becomes faster, thereby enhancing dissolving efficiency.

Another aspect of the detailed description is to provide a saturator and a water treating apparatus including the same, in which the saturator is freely disposed, and a space in which the saturator is disposed is small.

Another aspect of the detailed description is to provide a saturator and a water treating apparatus including the same, in which a flow rate of water which circulates between the saturator and a floatation apparatus is easily adjusted.

To achieve these and other advantages and in accordance with the purpose of this specification, as embodied and broadly described herein, a saturator includes: a chamber in which a first flow path through which first fluid flows is formed; and a plurality of porous membranes disposed in the first flow path, and in which a second flow path through which second fluid flows is formed, wherein the first fluid is dissolved in the second fluid, or the second fluid is dissolved in the first fluid.

The chamber may be formed in a pipe shape. The plurality of porous membranes may transmit one of the first and second fluids, and may not transmit the other fluid.

The first flow path may extend in parallel with the second flow path.

Alternatively, the first flow path may extend to intersect the second flow path a plurality of times, and the first fluid may flow to produce a vortex. As described above, the first flow path may intersect the second flow path a plurality of times, and thus, a vortex of the first fluid may be produced around the plurality of porous membranes. Accordingly, a speed in which the second fluid is dissolved in the first fluid becomes faster.

The first flow path may be formed by a partition wall which extends from a wall to an inner side of the chamber. A plurality of through holes may be formed at the partition wall, and thus, when the first fluid flows, a vortex can be easily produced.

In another aspect of the present invention, a water treating apparatus includes: a saturator configured to include a chamber, in which a first flow path is formed, and a plurality of porous membranes disposed in the first flow path and in which a second flow path is formed, wherein compressed water is dissolved in water in the saturator; an air compressor configured to supply the compressed air to the saturator, a water supply apparatus configured to supply the water to the saturator; and a floatation apparatus configured to include a space in which dissolved air of the water supplied from the saturator floats in combination with a foreign material.

The chamber may be formed in a pipe shape. The plurality of porous membranes may transmit the compressed air, and may not transmit the water.

The water supply apparatus may include a pump configured to supply the water to the saturator, and a flow rate of the water supplied from the saturator to the floatation apparatus may be adjusted by the pump. In this case, the pump may supply at least some of the water, passing through the floatation apparatus, to the saturator.

The air compressor may supply the compressed air to the first flow path, and the water supply apparatus may supply the water to the second flow path. Alternatively, the air compressor may supply the compressed air to the second flow path, and the water supply apparatus may supply the water to the first flow path.

The first flow path may extend in parallel with the second flow path.

Alternatively, the first flow path may extend to intersect the second flow path a plurality of times, and the first fluid may flow to produce a vortex. In this case, the first flow path may be formed by a partition wall which extends from a wall to an inner side of the chamber. A plurality of through holes may be formed at the partition wall, and thus, when the first fluid flows, a vortex can be easily produced.

The partition wall may spirally extend in an extension direction of the second flow path. Alternatively, a plurality of the partition walls may be alternately disposed at a facing inner wall surface of the chamber, and thus, the first flow path may be formed in zigzags.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Exemplary embodiments of the present invention capable of being easily embodied by those skilled in the art will now be described in detail with reference to the accompanying drawings. In the following description, when the detailed description of the relevant known function or configuration is determined to unnecessarily obscure the important point of the present invention, the detailed description will be omitted.

Figure 2:
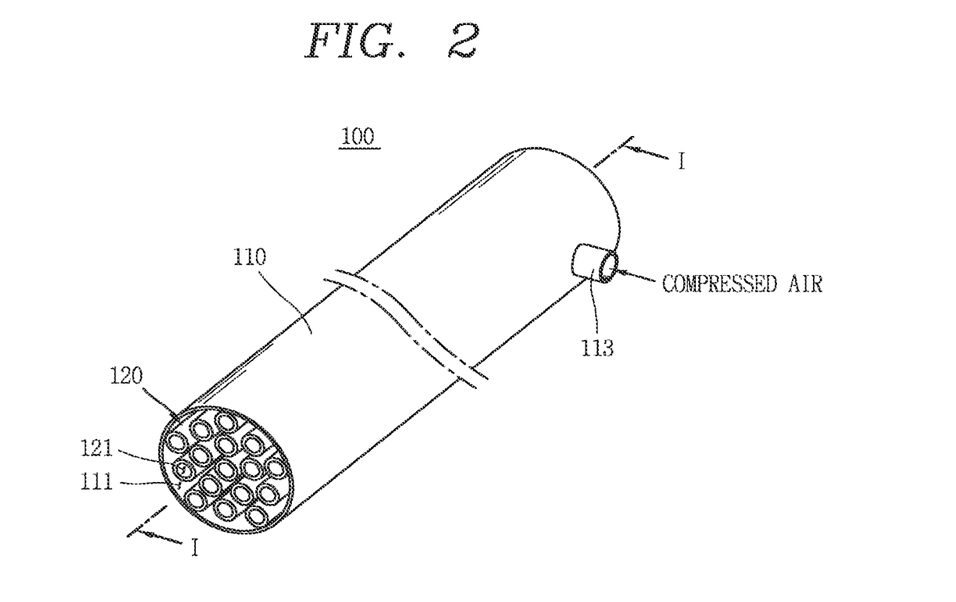
FIG. 2 is a perspective view illustrating a saturator according to a first embodiment of the present invention.
Figure 3:
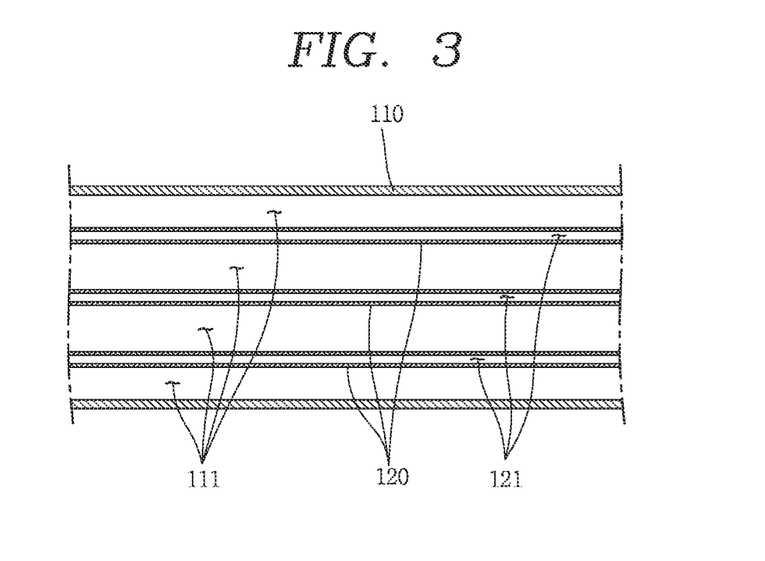
FIG. 3 is a cross-section view taken along line I-I of FIG. 2.
Figure 4:
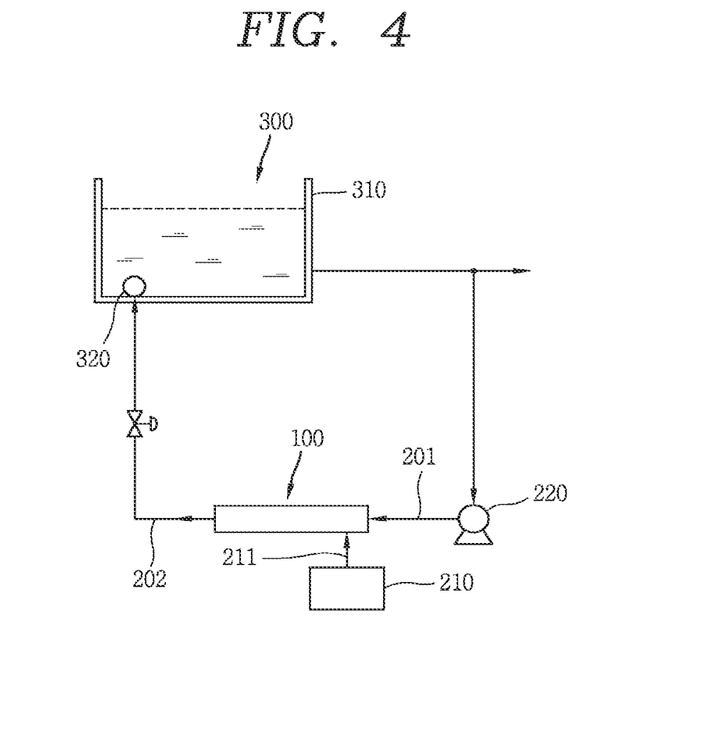
FIG. 4 is a diagram schematically illustrating a water treating apparatus according to a first embodiment of the present invention.
Figure 5:
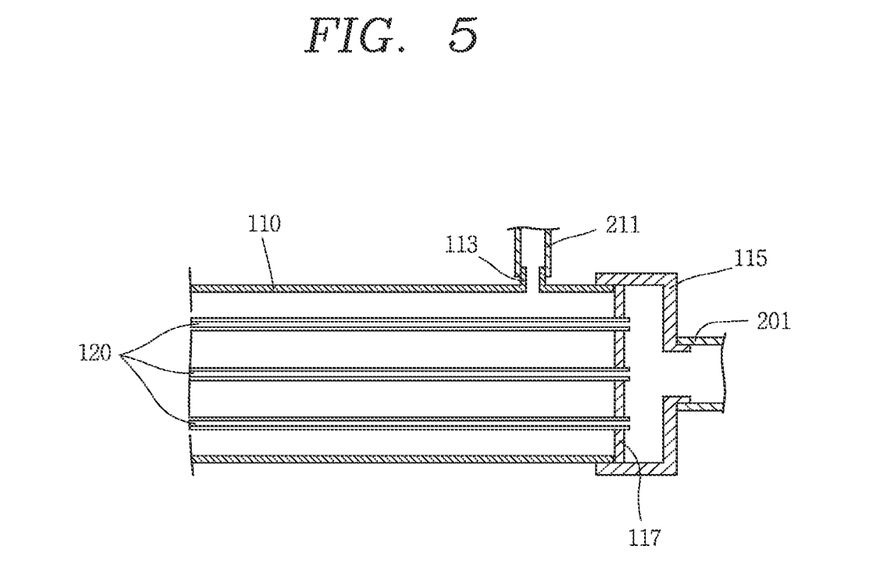
FIG. 5 is a cross-sectional view illustrating a state in which a saturator of FIG. 4 is connected to an air compressor and a water inlet pipe.

FIG. 2 is a perspective view illustrating a saturator according to a first embodiment of the present invention. FIG. 3 is a cross-section view taken along line I-I of FIG. 2. FIG. 4 is a diagram schematically illustrating a water treating apparatus according to a first embodiment of the present invention. FIG. 5 is a cross-sectional view illustrating a state in which a saturator of FIG. 4 is connected to an air compressor and a water inlet pipe. A saturator and a water treating apparatus including the same according to an embodiment of the present invention will be described in detail with reference to FIGS. 2 to 5.

A saturator 100 according to a first embodiment of the present invention is an apparatus into which first fluid and second fluid flow and in which the first fluid and the second fluid are dissolved. The saturator 100 includes a chamber 110, in which a first flow path is formed, and a plurality of porous membranes 120 which are disposed in the first flow path and in which a second flow path is formed. The first fluid flowing into the saturator 100 according to the first embodiment is compressed air, and the second fluid is water. Hereinafter, water in which the compressed air is dissolved in the saturator 100 is referred to as saturated water. Also, an upstream and a downstream of a flow path are defined with respect to a direction in which water flows.

The chamber 110 is a pipe in which the first flow path 111 is formed, and the first fluid (i.e., the compressed air) may move through the first flow path. Specifically, the chamber 110 is a cylinder in which a hollow space is formed, and the hollow space is a first flow path 111. However, a shape of the chamber 110 is not limited thereto, and the chamber 110 may have any shape which enables the compressed air to be dissolved in water. For example, the chamber 110 may be formed as a pipe having a polygonal cross-section.

The chamber 110 may further include a first fluid inflow part 113 which communicates with the first flow path 111 at an upstream of the first flow path 111. Compressed air may be supplied to the first flow path 111 through the first fluid inflow part 113. Referring to FIG. 2, the first fluid inflow part 113 may be formed in a pipe shape at a side wall of an upstream side of the chamber 110, and may be provided so that the compressed air is supplied from a side of the chamber 110 to the first flow path 111. However, the present embodiment is not limited thereto. For example, the first fluid inflow part 113 may be provided to communicate with the first flow path 111 at a side end of the upstream side of the chamber 110, and the compressed air may flow from one end of the first flow path 111 into the first fluid inflow part 113. Also, the first fluid inflow part 113 may be provided in plurality depending on the case.

Referring to FIG. 5, in the chamber 110, a plurality of second fluid inflow parts 115 and 117 may be further formed at an end adjacent to the first fluid inflow part 113. The second fluid inflow parts 115 and 117 are formed so that water supplied to the saturator 100 is transferred to a second flow path 121 through a water path 201. The second fluid inflow parts 115 and 117 may include a connection part 115, which connects the water path 201 to an upstream side end of the chamber 110, and a blocking membrane 117 which blocks a space between the connection part 115 and the first flow path 111 so that water flowing from the water path 201 flows into only the second flow path 121 without flowing into the first flow path 111. A through hole into which an end of the porous membrane 120 is inserted may be formed at the blocking membrane 117, and the connection part 115 fluid-communicates with the second flow path 121. Therefore, water flowing into the connection part 115 is not supplied to the first flow path 111 but is supplied to only the second flow path 121.

A shape of each of the second fluid inflow parts 115 and 117 is not limited thereto, and the second fluid inflow parts 115 and 117 may have all shapes in which water supplied from the water path 201 to the saturator 100 flows into the second flow path 121 without flowing into the first flow path 111.

The second flow path 121 may be formed in the porous membrane 120, and the second fluid (i.e., the water) may move through the second flow path 121. The porous membrane 120 may be a cylindrical membrane in which a hollow space is formed, and the hollow space may be the second flow path 121. The porous membrane 120 may be an angular membrane. The porous membrane 120 may be provided in plurality in the first flow path 111, and the plurality of porous membranes 120 may be arranged in parallel at certain intervals, and may extend in a direction in which the first flow path 111 extends.

The porous membrane 120 may be a membrane in which a pore is formed in plurality at a wall. In this case, the pore may be formed so that the compressed air flowing in the first flow path 111 passes through the porous membrane 120, but the water flowing in the second flow path 121 hardly passes through the porous membrane 120. Therefore, the pore formed at the porous member 120 may have a size of 50 μm or less, and for example, have a size having a range of 1 μm to 100 μm. When a size of the pore formed at the porous membrane 120 is less than 1 μm, pressure loss occurs, and when the size of the pore formed at the porous membrane 120 is 500 μm or more, water freely passes through the porous membrane 120. The porous membrane 120 may be formed of a plastic material such as poly ethylene (PE).

An inner diameter of the porous membrane 120 for determining a cross-sectional area of the second flow path 121, the number of the porous membranes 120 included in the first flow path 111, and a length of the porous membrane 120 may be determined based on a flow rate necessary for water treatment and a degree to which compressed air is dissolved in water.

An operation in which compressed air is dissolved in water in the saturator 100 will now be described. Compressed air may be supplied to the first flow path 111 through the first fluid inflow part 113. In this case, air which is compressed at two bars or more may be supplied as the compressed air. Also, water may be supplied to the second flow path 12I through the second fluid inflow part 115. The compressed air may flow through the first flow path 111, pass through the porous membrane 120, and move to the second flow path 121. The water may flow through the second flow path 121 in the same direction as a direction in which the compressed air flows, and the compressed air is dissolved in the water to produce saturated water.

According to the above-described configuration, a contact area between water and compressed air is enlarged, and thus, a saturation rate is enhanced. Also, since the saturator according to an embodiment of the present invention has a structure in which the porous membrane is provided in the chamber having a pipe shape, the saturator according to an embodiment of the present invention is not particularly high, unlike the related art saturator, and may be disposed to be horizontal or to be inclined.

Moreover, according to the above-description configuration, the compressed air is directly supplied to the first flow path, and the water is directly supplied to the second flow path. Therefore, a measurement apparatus such as a water gauge is not needed, and thus, a configuration is simple. In the related art saturator, water and compressed air flow into a space filled with a filler at an upper end of the saturator, and thus, the measurement apparatus such as the water gauge is needed. However, since the compressed air is supplied to the first flow path, and the water is supplied to the second flow path, the measurement apparatus is not needed.

Referring to FIG. 4, the water treating apparatus according to the first embodiment of the present invention includes a saturator 100, a water supply apparatus, an air compressor 210, and a floatation apparatus 300. The saturator 100 is the above-described saturator according to the first embodiment, and thus, its detailed description is not provided.

The floatation apparatus 300 is an apparatus in which saturated water produced in the saturator 100 flows into the floatation apparatus 300 to produce an air bubble, and a foreign material of treated water filled in the floatation apparatus 300 floats in combination with the air bubble. The floatation apparatus 300 may include a treated water tank 310, in which a space where a foreign material is removed while treated water is flowing is formed, and a nozzle 320 which is disposed under the treated water tank 310. The saturated water produced in the saturator 100 may be supplied to the nozzle 320, and a pressure of the saturated water may increase in the nozzle 320 to produce an air bubble. The floatation apparatus 300 is a known element, and thus, its detailed description is not provided.

The water supply apparatus may supply water from an external water source to the saturator 100, or supply some of treated water, passing through the floatation apparatus 300, to the saturator 100. In the present embodiment, a case of supplying water passing through the floatation apparatus 300 will be described.

The water supply apparatus may include a pump 220, which pumps water, discharged from the floatation apparatus 300, to the saturator 100, and a water path 201 through which the water flows from the floatation apparatus 300 to the saturator 100 due to the pump 220.

Moreover, the water supply apparatus may further include a control unit that controls the pump 220 to adjust a flow rate of the saturated water. As described above, the first fluid inflow part 113 and the second fluid inflow parts 115 and 117 are separately provided in the saturator 100 according to the present embodiment, the first fluid is supplied to the first flow path, and the second fluid is supplied to the second flow path. Therefore, when desiring to adjust the flow rate of the saturated water in a state of maintaining an internal pressure of the saturator 100, the flow rate of the saturated water is simply adjusted by controlling the pump 220. Accordingly, the flow rate of the saturated water is adjusted without adjusting the number of the nozzles 320.

The water path 201 may be connected to the second fluid inflow parts 115 and 117, and the water supply apparatus may supply water. As described above, the water path 201 may communicate with the second flow path 121, and may not communicate with the first flow path 111. Therefore, water may flow into the second flow path 121 through the water path 201.

The air compressor 210 may supply compressed air to the saturator 100. The air compressor 210 may supply air, which is compressed at two bars or more, to the saturator 100. Referring to FIG. 5, in the air compressor 210, a compressed air flow path 211 in which compressed air flows may communicate with the first fluid inflow part 113, and the compressed air may be supplied to the first flow path 111. The air compressor 210 may have an arbitrary configuration in which air is compressed at two bars or more, and is supplied. A detailed configuration of the air compressor 210 has been known to those skilled in the art, and thus, its detailed description is not provided.

The saturator 100 may be supplied with water from the water supply apparatus, may be supplied with the compressed air from the air compressor 210, and may dissolve the compressed air in the water. As described above, the compressed air may flow through the first flow path 111, pass through the porous membrane 120, flow into the second flow path 121, and may be dissolved in the water which flows in the second flow path 121. At this time, the compressed air and the water may flow in the same direction to produce saturated water. A saturated water supply path 202 may extend from a downstream of the saturator 100 to the nozzle 320, and supply the saturated water to the nozzle 320.

The saturated water supply path 202 may directly connect the saturator 100 to a header of the nozzle 320. When the saturator 100 is connected to the header of the nozzle 320, pressure loss is reduced, and thus, more micro air bubbles are produced through the nozzle 320.

As described above, since the saturator 100 has a pipe shape, it is not required to install the floatation apparatus 300 in a building, and thus, the installation cost and the maintenance cost can be reduced. In addition, air conditioning equipment or fire fighting equipment are not needed, and thus, facilities or elements necessary for the water treating apparatus according to an embodiment of the present invention are simplified.

Figure 6:
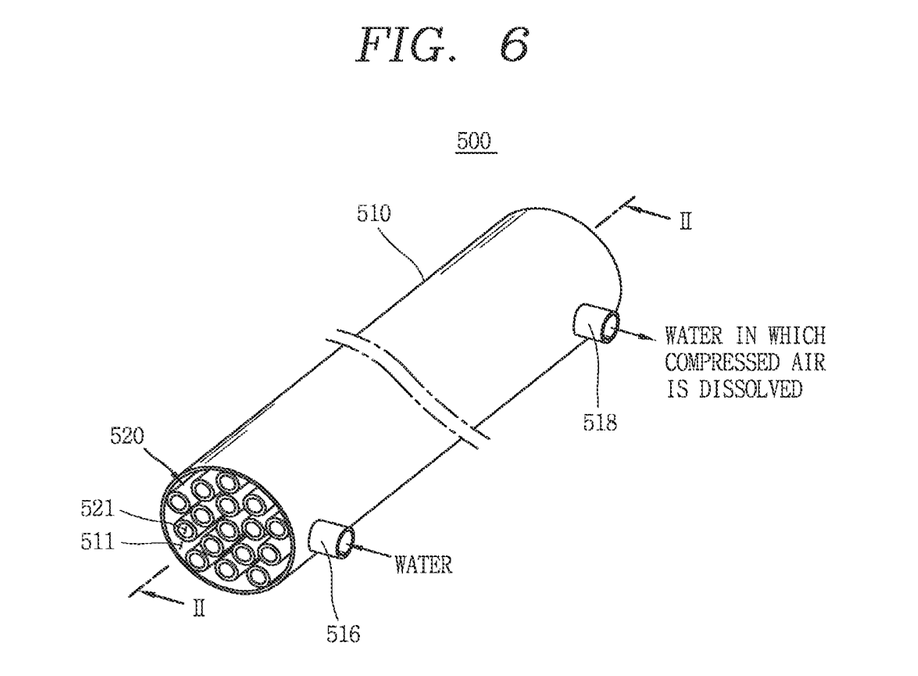
FIG. 6 is a perspective view illustrating a saturator according to a second embodiment of the present invention.
Figure 7:
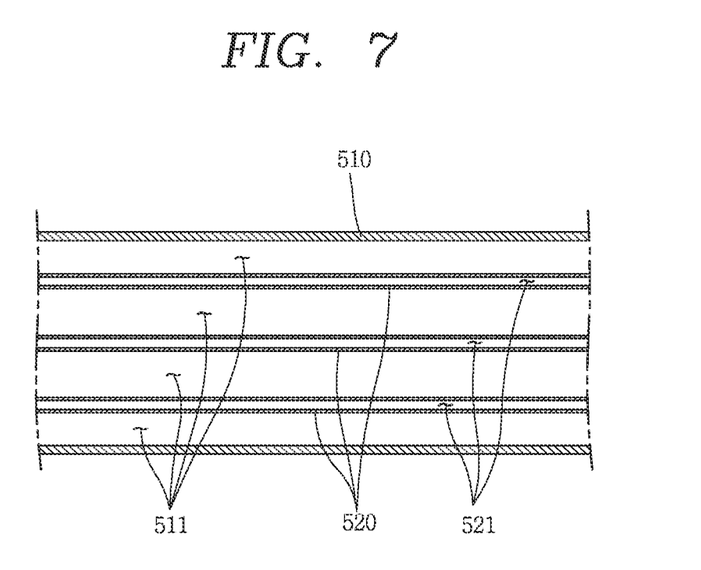
FIG. 7 is a cross-sectional view taken along line II-II of FIG. 6.

A saturator 500 according to a second embodiment of the present invention is an apparatus into which first fluid and second fluid flow and in which the second fluid is dissolved in the first fluid. The saturator 500 according to the second embodiment of the present invention includes a chamber 510, in which a first flow path is formed, and a plurality of porous membranes 520 which is disposed in the first flow path and in which a second flow path is formed. The first fluid flowing into the saturator 500 according to the second embodiment is water, and the second fluid is compressed air. Hereinafter, water in which the compressed air is dissolved in the saturator 500 is referred to as saturated water. Also, an upstream and a downstream of a flow path are defined with respect to a direction in which water flows.

The chamber 510 is a pipe in which a first flow path 511 is formed, and the first fluid (i.e., the water) may move through the first flow path. In detail, the chamber 510 is a cylinder in which a hollow space is formed, and the hollow space is the first flow path 511. However, a shape of the chamber 510 is not limited thereto, and may be modified.

The chamber 510 may further include a first fluid inflow part 516, which communicates with the first flow path 511, and a second fluid outflow part 518. Water may be supplied to the first flow path 511 through the first fluid inflow part 516, and water in which compressed air is dissolved while flowing in the first flow path 511 may be discharged to the first fluid outflow part 518.

Referring to FIG. 6, the first fluid inflow part 516 may be formed in a pipe shape at a side wall of an upstream side of the chamber 510, and the first fluid outflow part 518 may be formed in a pipe shape at a side wall of a downstream side of the chamber 510. An installation position and a shape of each of the first fluid inflow part 516 and the first fluid outflow part 518 are not limited thereto, and the first fluid inflow part 516 and the first fluid outflow part 518 may be modified to various shapes in which water is supplied to the first flow path 511 and saturated water is discharged. Also, each of the first fluid inflow part 516 and the first fluid outflow part 518 may be provided in plurality.

A second flow path 521 may be formed in each of the plurality of porous membranes 520, and the second fluid (i.e., the compressed air) may move through the second flow path 521. A physical feature and a shape of each of the plurality of porous membranes 520 are the same as those of the porous membrane 120 according to the first embodiment of the present invention, and thus, their detailed descriptions are not provided. However, in comparison with the first embodiment, the second embodiment has a difference in that compressed air flows through the second flow path 521, passes through the porous membrane 520, and moves to the first flow path 511.

Figure 11:
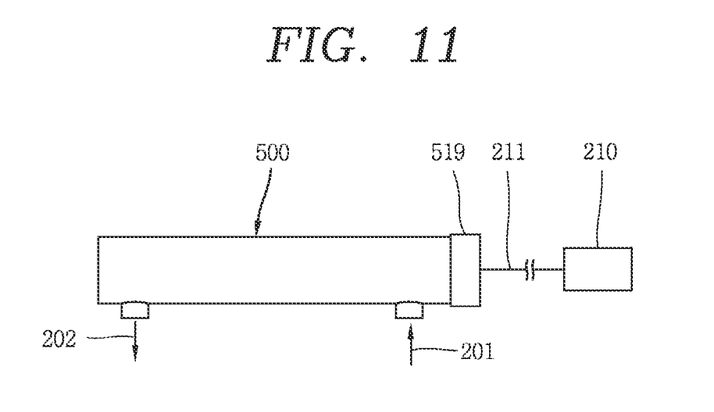
FIG. 11 is a diagram schematically illustrating some elements of a water treating apparatus according to a second embodiment of the present invention.

Referring to FIG. 11, the chamber 510 may further include a second fluid inflow part 519. The second fluid inflow part 519 has the same function and shape as those of the second fluid inflow parts 115 and 117 described above with reference to FIG. 5. However, unlike the above description, a connection part may be connected to the compressed air flow path 211 of the air compressor 210, and compressed air may be supplied to the second flow path 521.

An operation in which compressed air is dissolved in water in the saturator 500 will now be described. First, water may be supplied to the first flow path 511 through the first fluid inflow part 516, and compressed air may be supplied to the second flow path 521 through the second fluid inflow part 519. In this case, air which is compressed at two bars or more may be supplied as the compressed air. The compressed air may flow through the second flow path 521, pass through the porous membrane 520, and move to the first flow path 511. The water may flow through the first flow path 511 in the same direction as a direction in which the compressed air flows, and the compressed air may be dissolved in the water to produce saturated water.

Effects of the above-described configuration are the same as those of the first embodiment.

Figure 8:
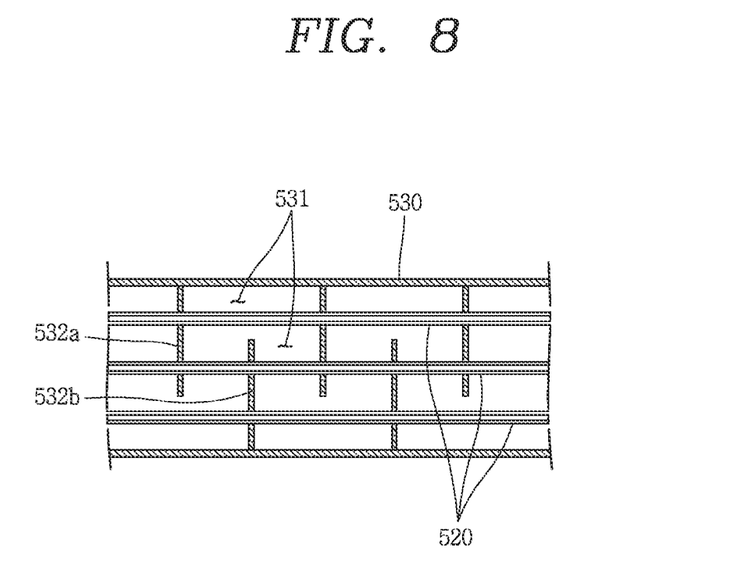
FIG. 8 is a cross-sectional view illustrating a modification embodiment of a chamber of FIG. 7.
Figure 9:
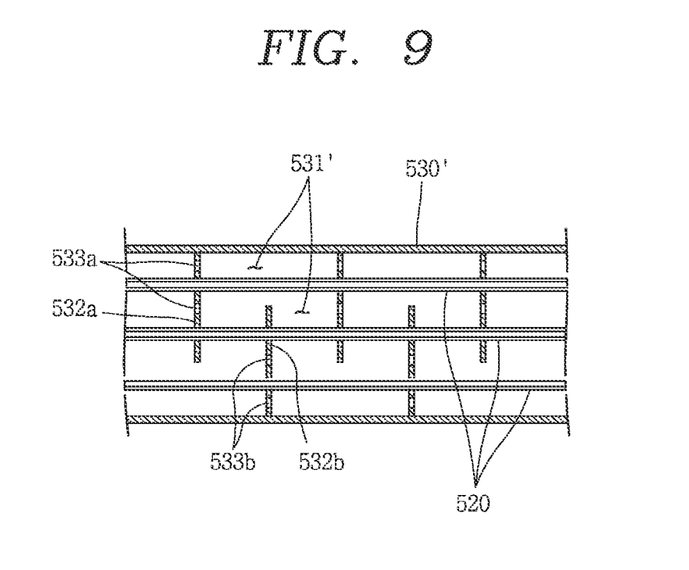
FIG. 9 is a cross-sectional view illustrating another embodiment of a partition wall of FIG. 8.
Figure 10:
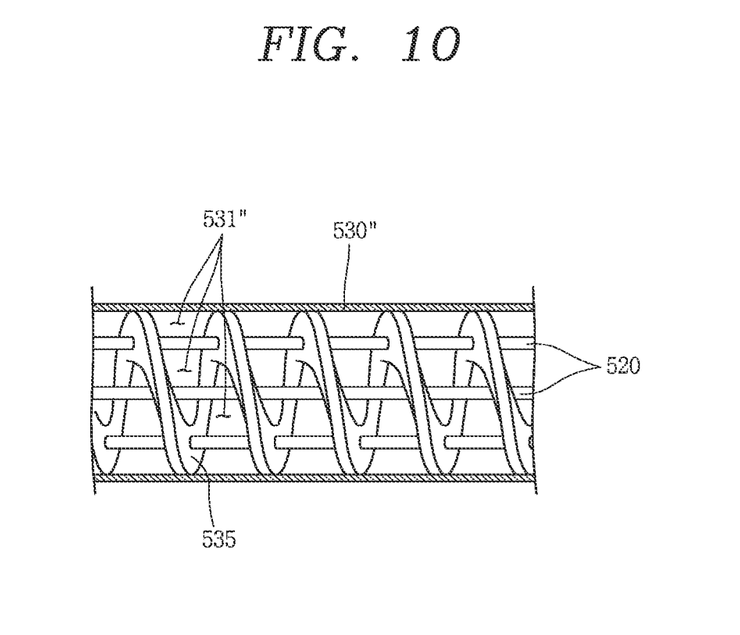
FIG. 10 is a cross-sectional view illustrating another embodiment of the partition wall of FIG. 8.

FIGS. 8 to 10 illustrate modification examples 530, 530', and 530" of a chamber. A modification example of the chamber will be described in detail with reference to FIGS. 8 to 10. A chamber 530 may have a shape in which a first flow path 531 extends by intersecting a second flow path 521 a plurality of times. To this end, the chamber 530 may further include a plurality of partition walls 532a and 532b.

The partition walls 532a and 532b may extend from an inner wall surface of the chamber 530 to an opposite inner wall surface, and one end of each of the partition walls 532a and 532b may be separated from the opposite inner wall surface. The partition walls 532a and 532b may extend to cross the porous membrane 520. In other words, the partition walls 532a and 532b may extend to be vertical to an extension direction of the porous membrane 520. Referring to FIG. 8, the plurality of porous membranes 520 may be provided so that a plurality of porous membranes 520 pass through one of the partition walls 532a and 532b. Also, the plurality of porous membranes 520 may be provided so that one porous membrane 520 passes through the plurality of partition walls 532a and 532b. When one partition wall 532a extends from the inner wall surface of the chamber 530 to an opposite inner wall surface, the partition wall 532b which is disposed next to the partition wall 532a may extend from an inner wall surface opposite to an inner wall surface in which the partition wall 532a is disposed. In this way, a plurality of partition walls may alternately extend from opposite inner wall surfaces to an inner side, and the first flow path 531 may be formed to extend in zigzags.

According to the above-described configuration, water flowing through the first flow path 531 meets the second flow path 521 a plurality of times, and moreover, the first flow path 531 is formed in zigzags, whereby a vortex or a warm current is actively produced by a flow of water. Accordingly, a speed in which compressed air is dissolved in water becomes faster.

FIG. 9 illustrates a modification embodiment in which a vortex and a warm current are more produced when water flows through a first flow path 531', and is a cross-sectional view illustrating a chamber 530' in which a plurality of through holes 533a and 533b are formed at the partition walls 532a and 532b. Water may flow through the partition walls 532a and 532b due to the through holes 533a and 533b, and thus, a vortex and a warm current are more produced. However, a shape of each of the partition walls 532a and 532b is not limited thereto, and may be modified to all shapes in which a vortex is more produced by a flow of fluid. For example, a plurality of concave grooves instead of the through holes 533a and 533b may be formed at each of the partition walls 532a and 532b. Alternatively, each of the partition walls 532a and 532b may be formed in a wave shape.

FIG. 10 is a partial cross-sectional view illustrating a chamber 530" in which a partition wall 535 is formed in a spiral shape. The partition wall 535 may be a plate shape which spirally extends in a direction where water flows. One porous membrane 520 may extend to pass through the partition wall 535 a plurality of times. A spiral outer border of the partition wall 535 may be fixed to an inner wall surface of the chamber 530". Therefore, a first flow path 531" having a spiral shape may be formed between a plurality of the partition walls 535, and may intersect a second flow path a plurality of times.

FIG. 11 is a diagram schematically illustrating some elements of a water treating apparatus including the saturator 500 according to the above-described embodiment. A water treating apparatus according to a second embodiment of the present invention may be an apparatus in which the above-described saturator 500 is provided in the water treating apparatus of FIG. 4. The water treating apparatus according to the second embodiment of the present invention may include the saturator 500, the water supply apparatus, the air compressor 210, and the floatation apparatus 300. The saturator 500 and the floatation apparatus 300 are as described above.

In the water supply apparatus, the first fluid inflow part 516 may be connected to the water path 201, and water may be supplied to the saturator 500. Therefore, the water path 201 may communicate with the first flow path 511, and may not communicate with the second flow path 521. Therefore, the water may flow into the first flow path 511 through the water path 201. Also, the water supply apparatus may include a pump 220, and details relevant to the pump 220 have been described above. Thus, a detailed description is not provided.

The air compressor 210 may supply compressed air to the saturator 500. The air compressor 210 may supply air, which is compressed at two bars or more, to the saturator 500. Referring to FIG. 11, in the air compressor 210, the compressed air flow path 211 in which compressed air flows may communicate with the second fluid inflow part 119, and supply the compressed air to the second flow path 521. The air compressor 210 is as described above, and thus, its detailed description is not provided.

The saturator 500 may be supplied with water from the water supply apparatus, may be supplied with the compressed air from the air compressor 210, and may dissolve the compressed air in the water. As described above, the compressed air may flow through the second flow path 521, pass through the porous membrane 520, flow into the first flow paths 511 and 531, and may be dissolved in the water which flows in the first flow path. At this time, the compressed air and the water may flow in the same direction to produce saturated water. The saturated water supply path 202 may extend from the first fluid outflow part 518 to the nozzle 320, and supply the saturated water to the nozzle 320.

Figure 12:
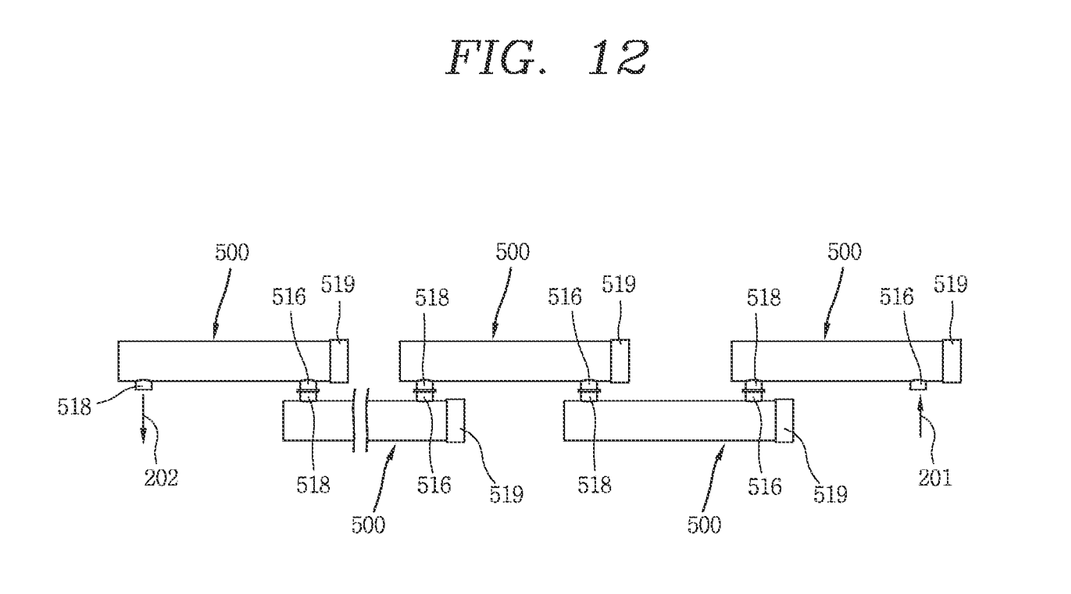
FIG. 12 is a diagram schematically illustrating some elements of a water treating apparatus according to a third embodiment of the present invention.

FIG. 12 is a diagram illustrating a water treating apparatus when a plurality of the saturators 500 are connected in series. Detailed configurations of the saturator 500, the water supply apparatus, the floatation apparatus 300, and the air compressor 210 are as described above. The plurality of saturators 500 may be connected in series for increasing a degree to which compressed air is dissolved in water. In this case, the first fluid inflow part 516 of the saturator 500 which is disposed at an uppermost stream may be connected to the water path 201, and the first fluid outflow part 518 may be connected to a first fluid inflow part of a next saturator. The first fluid inflow part of the next saturator may be connected to a first fluid inflow part of a saturator subsequent thereto. Connections are made in this way, and a first fluid inflow part of a last saturator may be connected to the saturated water supply path 202. Alternatively, although not shown, the plurality of saturators 500 is connected in parallel, and thus increases a whole flow rate of saturated water.

According to the embodiments of the present invention, a contact area is enlarged when compressed air is dissolved in water, and thus, dissolving efficiency is enhanced.

Moreover, according to the embodiments of the present invention, the saturator is freely disposed, and the installation cost and the maintenance cost are reduced.

Moreover, according to the embodiments of the present invention, a flow rate of saturated water supplied to the floatation apparatus is simply adjusted by controlling the pump.

Moreover, according to the embodiments of the present invention, a warm current is produced by a flow of fluid, and thus, a dissolving speed becomes faster.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds am therefore intended to be embraced by the appended claims.

What is claimed is:

1. A saturator comprising:
a cylindrical chamber in which a first flow path through which water flows is formed;
a plurality of porous membranes disposed in the first flow path, each of the plurality of porous membranes being in cylindrical shape and forming a second flow path through which compressed air flows, the second flow path extending in an axial direction of the cylindrical chamber and being configured to be connected at one end to an air compressor so that the compressed air flowing in the second path passes through the porous membranes from the second flow path to the first flow path to be dissolved in the water flowing in the first path; and
at least one partition wall that is formed on an inner wall of the cylindrical chamber so as to be disposed in the first flow path and extends in a radial direction of the cylindrical chamber such that the first flow path extends in the axial direction of the cylindrical chamber and is longer than the second flow path,
wherein each of the at least one partition wall is formed with a plurality of membrane through holes, through which the plurality of porous membranes passes, and a plurality of water through holes, other than the plurality of membrane through holes, through which the water passes, thereby producing a vortex.

2. The saturator of claim 1, wherein the first flow path crosses the second flow path in the radial direction a plurality of times and forms a zigzag pattern extending in a flow direction of the water flowing in the first flow path.

3. The saturator of claim 1, wherein the at least one partition wall extends from the inner wall of the cylindrical chamber to at least one of the plurality of porous membranes.

4. The saturator of claim 1, wherein the at least one partition wall includes a plurality of partition walls extending from opposite sides of the inner wall of the cylindrical chamber, each of the plurality of partition walls extending to at least one of the plurality of porous membranes.

5. The saturator of claim 4, wherein each of the plurality of partition walls extends beyond a center axis of the cylindrical chamber.

6. The saturator of claim 1, wherein the at least one partition wall has a spiral shape extending in a flow direction of the water flowing in the first flow path, allowing the water to flow downstream along the first flow path in an inclined direction while rotating in a circumferential direction.

7. The saturator of claim 1, wherein the at least one partition wall includes a plate having a radially outer side fixed to the inner wall of the cylindrical chamber.

8. The saturator of claim 7, wherein the at least one partition wall includes a plurality of partition walls, and
wherein the plurality of porous membranes includes one or more porous membranes that pass through the plurality of partition walls in the axial direction.

9. The saturator of claim 1, wherein each of the plurality of porous membranes has and outer wall formed of polyethylene having a pore diameter of 1 μm to 50 μm.

10. The saturator of claim 1, wherein the plurality of porous membranes are configured to pass the compressed air from the second flow path to the first flow path and to not pass the water from the first flow path to the second flow path.

11. The saturator of claim 1, wherein each of the plurality of porous membranes has a length determined based on a flow rate necessary for treatment of the water and a degree to which the compressed air is dissolved in the water.

12. A water treating apparatus comprising:
a saturator comprising:
a cylindrical chamber in which a first flow path through which water flows is formed,
a plurality of porous membranes disposed in the first flow path, each of the plurality of porous membranes being in a cylindrical shape and forming a second flow path through which compressed air flows, the second flow path extending in an axial direction of the cylindrical chamber and being configured to be connected at one end to an air compressor so that the compressed air flowing in the second path passes through the porous membranes from the second flow path to the first flow path to be dissolved in the water flowing in the first path, and at least one partition wall that is formed on an inner wall of the cylindrical chamber so as to be disposed in the first flow path and extends in a radial direction of the cylindrical chamber such that the first flow path extends in the axial direction of the cylindrical chamber and is longer than the second flow path;

the air compressor configured to supply compressed air to the second flow path of the saturator;

a water supply apparatus configured to supply water to the first flow path of the saturator; and a floatation apparatus including a space in which a foreign material floats in saturated water from the saturator, wherein each of the at least one partition wall is formed with a plurality of membrane through hoes, through which the plurality of porous membranes passes, and a plurality of water through holes, other than the plurality of membrane through holes, through which the water passes, thereby producing a vortex.

13. The water treating apparatus of claim 12, wherein the cylindrical chamber is formed as a pipe having a shape of one of a circular cylinder.

14. The water treating apparatus of claim 12, further comprising:
a water inflow part formed in a pipe shape at a side wall of an upstream side of the cylindrical chamber, the water inflow part forming a water inflow path, and
a water outflow part formed in a pipe shape at a side wall of a downstream side of the cylindrical chamber, the water outflow part forming a water outflow path,
wherein the water inflow part and the water outflow part are configured to engage with each other.

15. The water treating apparatus of claim 14, further comprising a compressed air inflow part formed at the upstream side of the cylindrical chamber adjacent to the water inflow part, the compressed air flow part forming a compressed air flow path and including:
a connection part which connects the compressed air flow path to an upstream side end of the cylindrical chamber and communicates with the second flow path, and
a blocking membrane which blocks a space between the connection part and the first flow path so that the water from the water inflow path flows into only the first flow path without flowing into the second flow path, the blocking membrane having a through hole into which an end of each of the plurality of porous membranes is inserted.

16. The water treating apparatus of claim 15, wherein the compressed air flow path is connected to the air compressor, the water inflow path is connected to the water supply apparatus, and the water outflow path is connected to the floatation apparatus.

17. The water treating apparatus of claim 12, wherein the water supply apparatus comprises a pump configured to supply at least some of the water passing through a floatation apparatus to the saturator and to adjust a flow rate of the water supplied from the saturator to the floatation apparatus.

18. A water treating apparatus comprising a plurality of saturators connected to each other in series, each of the plurality of saturators comprising:
a cylindrical chamber in which a first flow path through which water flows is formed;
a plurality of porous membranes disposed in the first flow path, each of the plurality of porous membranes being in a cylindrical shape and forming a second flow path through which compressed air flows, the second flow path extending in an axial direction of the cylindrical chamber and being configured to be connected at one end to an air compressor so that the compressed air flowing in the second path passes through the porous membranes from the second flow path to the first flow path to be dissolved in the water flowing in the first path;
a water inflow part formed in a pipe shape at a side wall of an upstream side of the cylindrical chamber;
a water outflow part formed in a pipe shape at a side wall of a downstream side of the cylindrical chamber; and
a compressed air inflow part formed at the upstream side of the cylindrical chamber adjacent to the water inflow part and connected to the air compressor configured to supply compressed air to the second flow path,
wherein the plurality of saturators includes:
an upstream end saturator having a dedicated water inflow part connected to a water supply apparatus configured to supply water to the first flow path of the upstream end saturator;
a downstream end saturator having a dedicated water outflow part connected to a floatation apparatus including a space in which a foreign material floats in saturated water from the downstream end saturator; and
at least one intermediate saturator connected between the upstream saturator and the downstream saturator, each of the at least one intermediate saturator having a dedicated water outflow part configured to engage with a dedicated water inflow part of another saturator of the plurality of saturators,
wherein each of the at least one partition wall is formed with a plurality of membrane through holes, through which the plurality of porous membranes passes, and a plurality of water through holes, other than the plurality of membrane through holes, through which the water passes, thereby producing a vortex.

19. The water treating apparatus of claim 18, wherein each of the at least one intermediate saturator has a dedicated water inflow part configured to engage with a dedicated water outflow part of another saturator of the plurality of saturators.

* * * * *